(12) United States Patent
Kharia et al.

(10) Patent No.: US 7,761,087 B2
(45) Date of Patent: Jul. 20, 2010

(54) APPARATUS, SYSTEM AND METHOD FOR PROVIDING SERVICES THROUGH A MULTI-MODE WIRELESS TERMINAL DEVICE

(75) Inventors: Yash Kharia, San Diego, CA (US); Anupam Juneja, San Diego, CA (US); Atul Suri, San Diego, CA (US); Scott Jarvis, San Diego, CA (US)

(73) Assignee: Kyocera Corporation, Kyoto (JP)

( * ) Notice: Subject to any disclaimer, the term of this patent is extended or adjusted under 35 U.S.C. 154(b) by 813 days.

(21) Appl. No.: 11/459,318

(22) Filed: Jul. 21, 2006

(65) Prior Publication Data
US 2008/0019333 A1    Jan. 24, 2008

(51) Int. Cl.
*H04M 3/42* (2006.01)

(52) U.S. Cl. ............ 455/414.1; 455/412.1; 455/552.1; 455/41.2; 455/406; 455/426.2; 370/328; 370/338; 370/401; 709/203

(58) Field of Classification Search .............. 455/426.1, 455/552.1, 41.2, 426.2, 3.05, 405–408; 370/338, 370/328, 401; 709/204
See application file for complete search history.

(56) References Cited

U.S. PATENT DOCUMENTS

| | | | | |
|---|---|---|---|---|
| 5,463,674 | A * | 10/1995 | Gillig et al. | 455/552.1 |
| 6,490,443 | B1 * | 12/2002 | Freeny, Jr. | 455/406 |
| 7,016,673 | B2 * | 3/2006 | Reddy et al. | 455/426.2 |
| 7,146,130 | B2 * | 12/2006 | Hsu et al. | 455/3.04 |
| 7,162,236 | B2 * | 1/2007 | Dorenbosch et al. | 455/432.1 |
| 7,340,216 | B2 * | 3/2008 | Haller et al. | 455/41.2 |
| 7,466,991 | B2 * | 12/2008 | Everson et al. | 455/552.1 |
| 7,505,446 | B2 * | 3/2009 | Pecen | 370/338 |
| 7,643,786 | B2 * | 1/2010 | Soderbacka et al. | 455/3.01 |
| 7,650,229 | B2 * | 1/2010 | Dorfstatter et al. | 701/117 |
| 2004/0077374 | A1 * | 4/2004 | Terry | 455/552.1 |
| 2004/0203346 | A1 * | 10/2004 | Myhre et al. | 455/11.1 |
| 2004/0205158 | A1 * | 10/2004 | Hsu | 709/218 |
| 2005/0020299 | A1 * | 1/2005 | Malone et al. | 455/552.1 |
| 2005/0148359 | A1 * | 7/2005 | Joeressen | 455/552.1 |
| 2005/0181779 | A1 * | 8/2005 | Jones et al. | 455/421 |
| 2006/0079280 | A1 | 4/2006 | Laperch | |
| 2006/0116127 | A1 | 6/2006 | Wilhoite et al. | |
| 2006/0217147 | A1 * | 9/2006 | Olvera-Hernandez et al. | 455/552.1 |
| 2007/0249323 | A1 * | 10/2007 | Lee et al. | 455/411 |
| 2008/0076385 | A1 * | 3/2008 | Mayer et al. | 455/407 |
| 2008/0130597 | A1 * | 6/2008 | Kalhan | 370/338 |
| 2009/0170519 | A1 * | 7/2009 | Wilhoite et al. | 455/436 |
| 2010/0067434 | A1 * | 3/2010 | Siu et al. | 370/328 |

OTHER PUBLICATIONS

"Convergence Services Using Bluetooth CTP Product Requirement Definitions Release 2.0" May 31, 2006, FMCA (http://www.thefmca.com/assets/pdf/FMCA_Bluetooth_CTP_PRD_2.0_Final.pdf.

"SIP-Enabled Gateway MSC: Linking WiFi Hot Spots with 2.5/3G Networks", Mar. 31, 2004, Atai A. et al. (http://www.telica.com/PDF/Telica-Whitepaper_Wifi_3g.pdf).

Fleishman, G. "Wireless Junxion Box will make auditors' lives easier", The Seattle Times: Business&Tech., Jun. 21, 2004 (at www.seattletimes.nwsource.com/html/businesstechnology).

Internet Doc:"KR1 Mobile Router Brochure", Feb. 2006 (at www.kyocera-wireless.com/kr1-router/pdf/kr1_router_product_brochure.pdf).

* cited by examiner

*Primary Examiner*—Sharad Rampuria

(57) ABSTRACT

A multi-mode wireless terminal device includes a first network interface for communicating with a first wireless network and a second network interface for communicating with a second wireless network. The second wireless network offers services that are not necessarily provided by the first wireless network. The multi-mode wireless terminal device acts as a gateway so that wireless terminal devices operating on the first wireless network may connect to the multi-mode wireless terminal device in order to access the services of the second wireless network. The multi-mode terminal device can limit access to the services based on operational parameters such as battery power level, wireless signal strength, usage time, processing load and the like.

15 Claims, 4 Drawing Sheets

APPARATUS, SYSTEM AND METHOD FOR PROVIDING SERVICES THROUGH A MULTI-MODE WIRELESS TERMINAL DEVICE

TECHNICAL FIELD

The invention relates generally to wireless communication systems and more specifically to an apparatus, system, and method for providing services through a multi-mode terminal device.

BACKGROUND

Wireless service providers are continually seeking new ways to expand wireless services (e.g., cellular services) and to maximize the capabilities and value of current wireless infrastructure. Thus, there have been efforts in the telecommunications industry to integrate the capabilities of conventional wide-area cellular networks (e.g., CDMA, GSM, UMTS, TDMA, etc.) and other types of networks, such as wireless local area networks (WLANs). These efforts have resulted in a relatively new class of wireless terminal devices known as "multi-mode" devices.

A multi-mode user device includes interfaces for communicating with more than one wireless network. Another term used to refer to multi-mode devices is "dual-mode device". The term dual-mode device refers generally to a user device that is capable of communicating with two different wireless networks, and it is frequently used synonymously with the term multi-mode terminal device.

Wireless multi-mode terminal devices represent a significant advance in wireless communications because they allow a single device to conveniently access services available on different networks.

In spite of the advantages of multi-mode terminal devices, there are a substantial number of wireless devices currently in use that are not capable of directly communicating with wide-area cellular networks. These wireless devices include single-mode terminal devices operating on WLANs, such as WiFi networks (e.g., IEEE-802.11a/b/g). Such non-cellular wireless devices are unlikely to be fully displaced by the emergence of multi-mode wireless devices because both device types typically address different market needs. In some instances, however, there may be an overlap in service needs, and thus, it would be desirable to offer cellular services to non-cellular, non-multi-mode wireless devices.

Accordingly, there is a need for an apparatus, system and/or method that allows a terminal device operating on a first wireless network, such as a WLAN, to access services available from a second wireless network, e.g., a wide-area cellular network.

SUMMARY

It is an advantage of the present invention to provide an apparatus, system and method for permitting a terminal device located on a first wireless network to access the services of a second wireless network that are not offered directly by the first network.

In accordance with an exemplary embodiment of the invention, a multi-mode wireless terminal device acts as a gateway so that other wireless terminal devices operating on the first wireless network may connect to the multi-mode wireless terminal device in order to access the services of the second wireless network. The multi-mode terminal device can limit access to the services based on its operational parameters such as battery power level, wireless signal strength, usage time, processing load and the like.

Other aspects, features, embodiments, methods and advantages of the invention will be or will become apparent to one with skill in the art upon examination of the following figures and detailed description. It is intended that all such additional features, embodiments, processes and advantages be included within this description, be within the scope of the invention, and be protected by the accompanying claims.

BRIEF DESCRIPTION OF THE DRAWINGS

It is to be understood that the drawings are solely for purpose of illustration and do not define the limits of the invention. Furthermore, the components in the figures are not necessarily to scale, emphasis instead being placed upon illustrating the principles of the invention. In the figures, like reference numerals designate corresponding parts throughout the different views.

DETAILED DESCRIPTION

The following detailed description, which references to and incorporates the drawings, describes and illustrates a specific embodiment of the invention. This embodiment, offered not to limit but only to exemplify and teach the invention, is shown and described in sufficient detail to enable those skilled in the art to practice the invention. Thus, where appropriate to avoid obscuring the invention, the description may omit certain information known to those of skill in the art.

Figure 1:
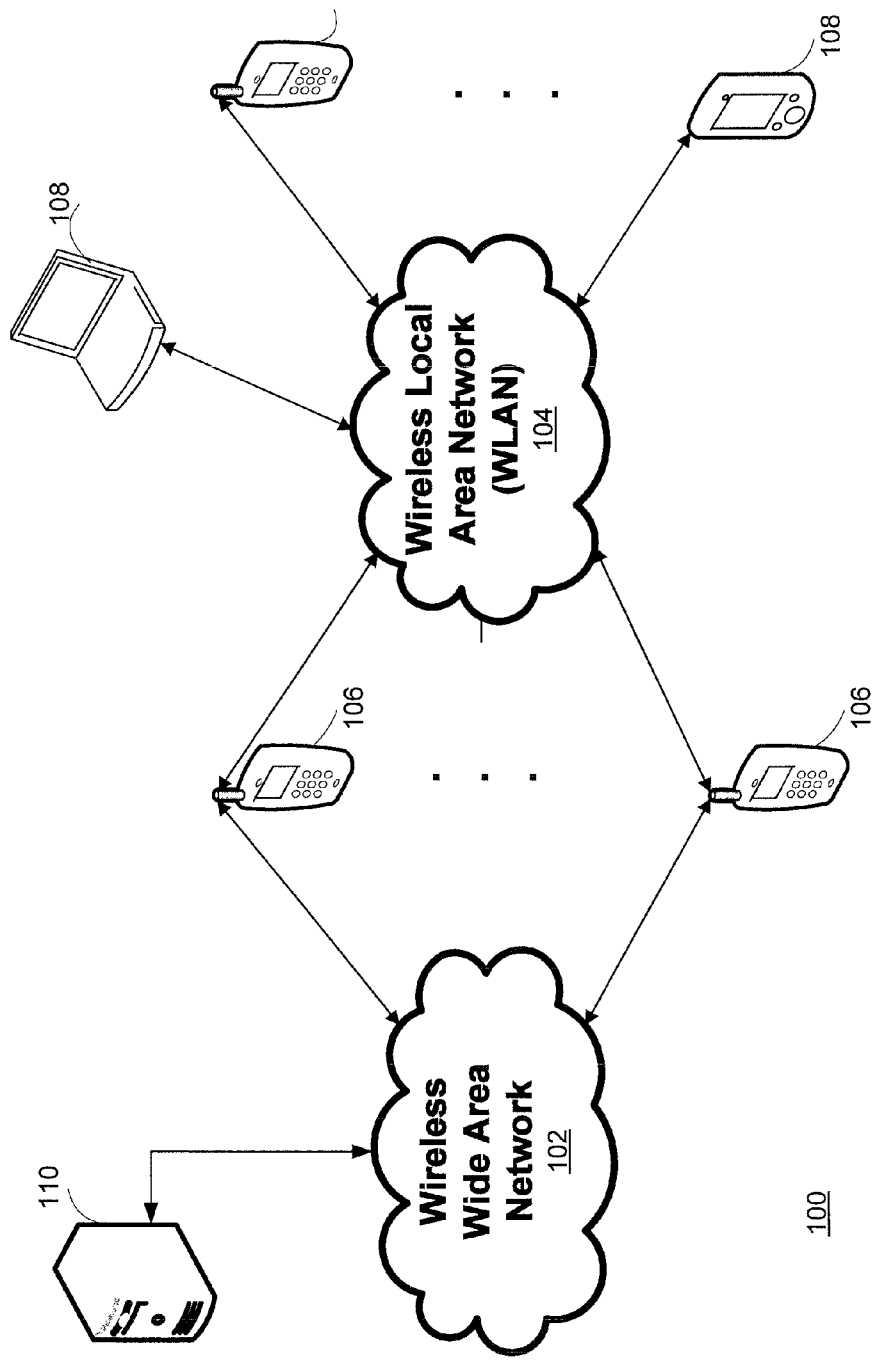
FIG. 1 is a block diagram of a wireless communication system in accordance with an exemplary embodiment of the invention.

FIG. 1 is a block diagram of a wireless communication system 100 in accordance with an exemplary embodiment of the invention. The exemplary communication system 100 includes a wireless wide area network (WWAN) 102, a wireless local area network (WLAN) 104 and one or more multi-mode wireless terminal devices 106 capable of exchanging signals with the wireless networks 102, 104. The multi-mode wireless terminal devices 106 facilitate voice calls and data services on either of the wireless networks 102, 104. In addition, the multi-mode wireless terminal devices 106 are configured to act as gateways so that other wireless terminal devices (WLAN terminal devices) 108 operating on the WLAN 104 may connect to the multi-mode wireless terminal devices 106 in order to access services offered only by the WWAN 102. These services may include voice service, data service, E911 service, short messaging service (SMS) or the like.

The WWAN 102 is preferably a cellular network such as a CDMA, WCDMA, GSM, UTMS, AMPS, PHS network or the like. The WWAN 102 includes infrastructure comprising those network elements necessary to support wireless voice and data communications with the multi-mode wireless terminal devices 106. The wireless communication infrastructure includes equipment such as controllers, transceivers and backhaul that establishes and maintains wireless communication with the multi-mode wireless terminal devices 106, as well as other terminal devices. The types and numbers of devices within the wireless infrastructures depend on the particular wireless network. For example, a typical cellular network includes sector antennas connected to several base transceiver stations (BTSs) connected to base station controllers (BSCs) that are connected to a Mobile Switching Center (s) (MSC). Cellular base station controllers are typically capable of communicating with an IP-based network, such as Internet, via a packet data server node (PDSN). Base stations are also capable of communicating with the public switched telephone network (PSTN) via the MSC. Thus, conventional cellular base stations included in the wireless network 102 use the MSC and PSTN to provide conventional voice connections and telephony services between the multi-mode terminal wireless devices 106 and other telephone devices over the WWAN 102. In addition, base stations of the WWAN 102 use a PDSN and the Internet to provide packet data services, such as voice-over-IP (VoIP) and short messaging service (SMS), between the multi-mode wireless terminal devices 106 and Internet protocol (IP) nodes, such as the account server 110, communicating with the WWAN 102.

The WLAN 104 is preferably a packet-based network, such as a WiFi network (e.g., IEEE-802.11a/b/g/n), that supports a peer-to-peer protocol between the wireless terminal devices 106, 108. The WLAN 104 includes those network elements necessary to support data and voice communications with the terminals 106, 108. With a WiFi 802.11x network, the WLAN terminal devices 108 can connect to the multi-mode wireless terminal devices 106 using ad hoc connections that are available on 802.11x networks. The 802.11x WLAN 104 also supports voice-over-IP (VoIP) service over the WiFi connections.

The multi-mode wireless terminal devices 106 may be any type of wireless communication device, such as a handheld cellular phone, personal digital assistant (PDA) or the like, that is capable of communicating with at least the two wireless networks 102, 104 and that is configurable to function as a wireless access gateway, as described herein.

The WLAN terminal devices 108 can be any type of wireless communication device, such as a handheld cellular phone, cordless phone, gaming device, wirelessly-enabled laptop or desktop computer, PDA or the like, that is capable of communicating with the WLAN 104 and implementing an access application 310 (see FIG. 3) as executed by the WLAN terminal devices 108 or its equivalent. Any of the devices 108 may also be multi-mode as well, like the multi-mode wireless terminal devices 106. Even though a WLAN terminal device 108 may be multi-mode, it may not have subscriptions to some services on WWAN 102 and can therefore buy those services from multi-mode wireless terminal device 106 over WLAN 104.

The specific forms of the multi-mode and WLAN terminals 106, 108 shown in FIG. 1 are exemplary only, and it is generally understood that a variety of terminals and terminal configurations could be used.

An account server 110 is included in the system 100 so that the multi-mode wireless terminal devices 106 offering access services can individually charge WLAN terminal users for accessing the WWAN 102 through the multi-mode gateways. The account server 110 can be any suitable type of computer, and is preferably a commercially-available server having a network interface card (not shown) and an operating system, such as Windows® or Linux, that permits data packet communications using conventional protocols such as TCP/IP, UDP/IP and/or HTTP. The account server 110 includes a charging account application that permits the multi-mode wireless terminal devices 106 to remotely charge debit and/or credit accounts held by the WLAN terminal users.

An example of a suitable third-party charging account service that can be used to perform the functions of the account server 110 is Paypal®. As will be discussed below in connection with FIGS. 4-5, during establishment of a communication session between a WLAN terminal device 108 and a multi-mode wireless terminal device 106, a WLAN user's Paypal® account information is transmitted to the assisting multi-mode wireless terminal device 106. The assisting multi-mode wireless terminal device 106 can then use the account information to automatically charge the user's Paypal® account for the amount of WWAN services used.

The functions and operations of the elements described in FIG. 1 may be implemented in any number of devices, circuits, or network elements. Two or more of the functional elements may be integrated in a single device and the functions described as performed in any single device may be implemented over several devices.

Figure 2:
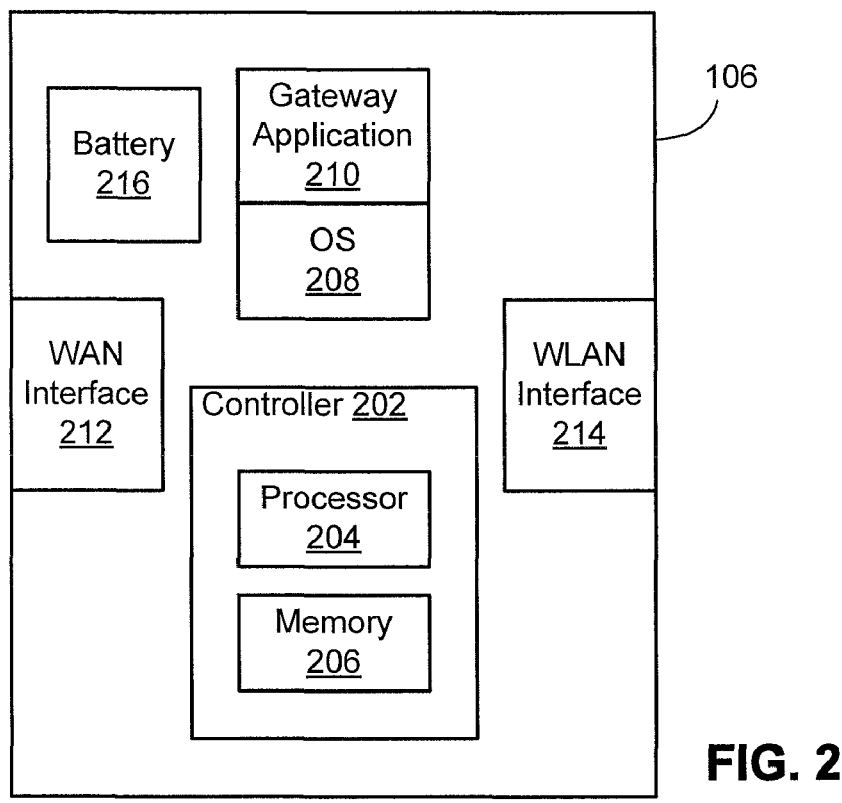
FIG. 2 is a conceptual block diagram showing details of a multi-mode wireless terminal device of the system shown in FIG. 1.

FIG. 2 is a conceptual block diagram showing components of one of the multi-mode wireless terminal devices 106 of the system 100. The multi-mode wireless terminal device 106 includes a controller 202, a WWAN interface 212, a WLAN interface 214, an operating system (OS) 208, a gateway software application 210 and battery 216. The hardware and software component function together to provide a means for the WLAN terminal devices 108 to access one or more services of the WWAN 102 by way of the WWAN and WLAN interfaces 212, 214 of the multi-mode wireless terminal device 106.

The controller 202 manipulates operations of the other components of the multi-mode wireless terminal device 106 and inbound/outbound digitized information to ensure that the multi-mode wireless terminal device 106 provides desired voice and data functions to the terminal user, as well as supports the access gateway functionality for the WLAN terminal devices 108. Although the controller 202 can be implemented using any suitable combination of hardware and software components, the controller 202 preferably comprises a processor-based architecture that includes a processor 204 and a memory 206 for storing software and data. Machine-readable data and executable instructions (also referred to as an application, software, code or program) are stored in the memory 206 and executed (or run) on processor 204. All memory devices described herein may comprise any suitable combination of volatile (e.g., random access memory) or non-volatile (e.g., read-only memory) storage as known in the art. Likewise, the processor 204 may comprise a microprocessor, microcontroller, digital signal processor, co-processor, similar devices or combinations thereof. Using known programming techniques, software stored in the memory 206 causes the controller 202 to operate the multi-mode terminal components to achieve the desired functionality of the multi-mode wireless terminal device 106, as described herein.

More particularly, the memory 206 stores the OS 208 and gateway software application 210. The OS 208 can be an off-the-shelf wireless device OS, such the Binary Runtime Environment for Wireless (BREW) OS from Qualcomm, Inc. The gateway software application 210 is a software program running on the OS 208 that causes the multi-mode wireless terminal device 106 to operate in accordance with the methods described below in connection with FIGS. 4-5. The gateway software application 210 can be written using conventional software development techniques.

The WWAN interface 212 comprises the entire physical interface necessary to communicate with the WWAN 102, including a wireless transceiver configured to exchange wireless signals with the WWAN 102. The WWAN interface 212 exchanges wireless signals with the WWAN 102 to facilitate voice calls and data transfers over the WWAN 102 to a connected device. The connected device may be another WWAN terminal, a landline telephone, or network service entity such as a voice mail server, Internet server or the like.

The WLAN interface 214 comprises the entire physical interface necessary to communicate with the WLAN 104, including a wireless transceiver configured to exchange wireless signals with the WLAN 104. The WLAN interface 214 exchanges wireless signals with the WLAN 104 to facilitate voice calls and data transfers over the WLAN 104 to a connected device. The connected device may be one of the WLAN terminal devices 108 or any other WLAN-enabled device. Where the WLAN is an IEEE 802.11x WiFi network, the WLAN interface 214 supports VoIP and peer-to-peer connectivity.

The battery 216 powers the multi-mode wireless terminal device 106 in at least some circumstances. The power level of the battery 216 is monitored by the controller 202.

Figure 3:
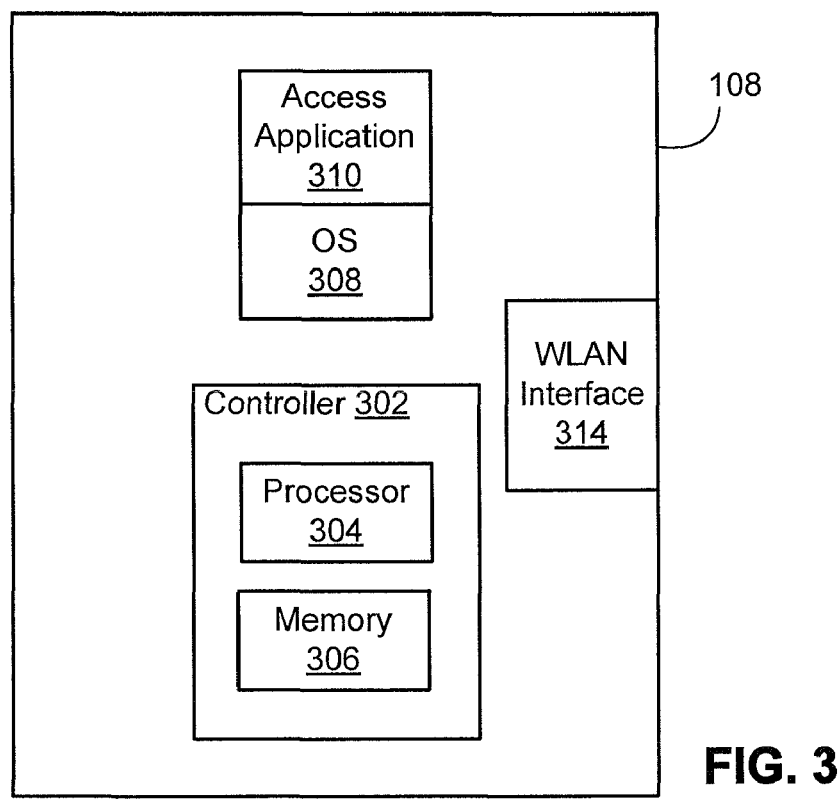
FIG. 3 is a conceptual block diagram showing details of a WLAN terminal device of the system shown in FIG. 1.

FIG. 3 is a conceptual block diagram showing details of a WLAN terminal device 108 of the system 100 shown in FIG. 1. The multi-mode wireless terminal device 106 includes a controller 302, a WLAN interface 314, an operating system (OS) 308, and an access application 310.

The controller 302 manipulates operations of the other components of the WLAN terminal device 108 and inbound/outbound digitized information to ensure that the terminal 108 provides desired voice and data functions to the terminal user, as well as supports the WWAN access functionality. Although the controller 302 can be implemented using any suitable combination of hardware and software components, the controller 302 preferably comprises a processor-based architecture that includes a processor 304 and memory 306 for storing software and data. Machine-readable data and executable instructions (also referred to as an application, software, code or program) are stored in the memory 306 and executed (or run) on processor 304. All memory devices described herein may comprise any suitable combination of volatile (e.g., random access memory) or non-volatile (e.g., read-only memory) storage as known in the art. Likewise, the processor 304 may comprise a microprocessor, microcontroller, digital signal processor, co-processor, similar devices or combinations thereof. Using known programming techniques, software stored in the memory 306 causes the controller 302 to operate the WLAN terminal components to achieve the desired functionality of the WLAN terminal device 108.

More particularly, the memory 306 stores the OS 308 and access application 310. The OS 308 can be an off-the-shelf OS, such the Binary Runtime Environment for Wireless (BREW) OS from Qualcomm, Inc, Microsoft Windows®, Palm or the like. The access application 310 is a software program running on the OS 308 that causes the WLAN terminal device 108 to operate in accordance with the methods described below in connection with FIGS. 4-5. The access application 310 can be written using conventional software development techniques.

The WLAN interface 314 comprises the entire physical interface necessary to communicate with the WLAN 104, including a wireless transceiver configured to exchange wireless signals with the WLAN 104. The WLAN interface 314 exchanges wireless signals with the WLAN 104 to facilitate voice calls and data transfers over the WLAN 104 to a connected device. The connected device may be one of the WLAN terminal devices 108 or multi-mode wireless terminal devices 106, or any other WLAN-enabled device. Where the WLAN is an IEEE 802.11x WiFi network, the WLAN interface 314 supports VoIP and peer-to-peer connectivity.

Figure 4:
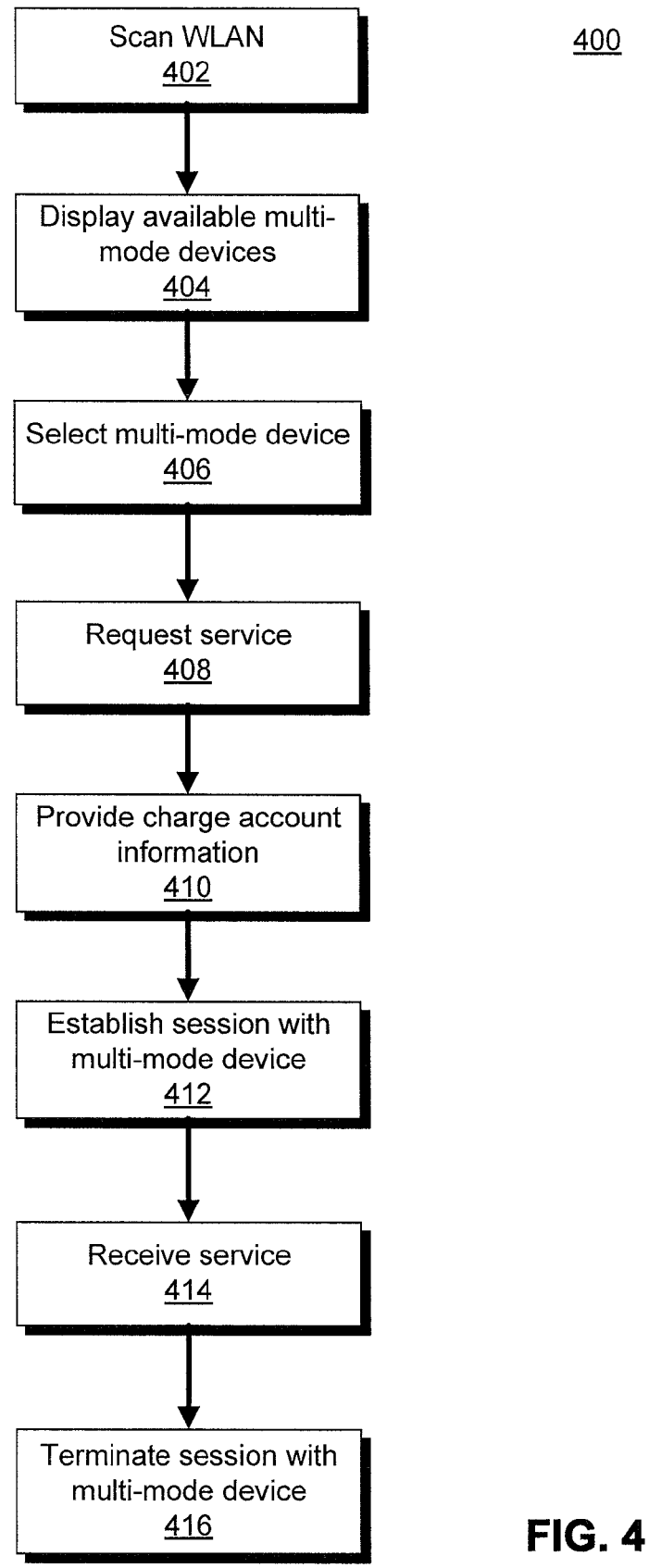
FIG. 4 is a flowchart of a method of operating a WLAN terminal device of the system shown in FIG. 1 in accordance with the exemplary embodiment of the invention.

FIG. 4 is a flowchart 400 of a method of operating one of the WLAN terminal devices 108 to access WWAN services through one of the multi-mode wireless terminal devices 106. Although the method may be performed by any combination of hardware, software and/or firmware in the WLAN terminal device 108, the method is preferably performed by hardware controlled by software 308, 310 running on the processor 304 of the WLAN terminal device 108.

In step 402, the WLAN terminal user indicates his/her intent to access a WWAN service through a user interface of the WLAN terminal device 108. This causes the access application 310 to begin execution. Initially, the access application 310 causes the WLAN terminal to scan the WLAN for a multi-mode wireless terminal device 106 offering the access service to devices located on the WLAN 104. With an IEEE 802.11x WLAN, the terminal device 108 performs this step by using the 802.11x scan function to scan for ad hoc multi-mode wireless terminal devices 106.

In step 404, the WLAN terminal device 108 displays to the user a list of one or more multi-mode wireless terminal devices 106 offering access to the WWAN 102.

In step 406, the user selects, using the WLAN terminal user interface, one of the listed multi-mode wireless terminal devices 106. The WLAN terminal device 108 then associates with the selected multi-mode wireless terminal device 106.

In step 408, the WLAN terminal device 108 requests an indication of WWAN services supported by the selected multi-mode wireless terminal device 106. The selected multi-mode wireless terminal device 106 responses with an indication of the supported services that it can share (e.g., WWAN voice, WWAN data, WWAN SMS, E911 or the like), allowed time limits, if any, for service usage and a charge per unit time for accessing those services. The services and associated charges are displayed by the WLAN terminal device 108. The user then selects the desired service from the list. Using an encrypted SIP message, the WLAN terminal device 108 sends the request for the selected service to the multi-mode wireless terminal device 106. In addition, the WLAN terminal device 108 also sends encrypted payment information, e.g., online charge or debit account information, to the multi-mode wireless terminal device 106 so that it may charge the WLAN terminal user for accessing the selected WWAN service (step 410).

If the multi-mode wireless terminal device 106 does not respond to any of the WLAN terminal requests, the requesting WLAN terminal device 108 will timeout and inform the user of no service support from the selected multi-mode wireless terminal device 106.

If the multi-mode wireless terminal device 106 accepts the service request, the multi-mode wireless terminal device 106 responses with a service granted message and a service session is then established between the WLAN terminal device 108 and the multi-mode wireless terminal device 106 in step 412.

To establish a voice service session, a VoIP connection between the WLAN terminal device 108 and the multi-mode wireless terminal device 106 is set up using a peer-to-peer SIP session. To do this, the WLAN terminal user dials the number of a called party who is available through the WWAN 102. The WLAN terminal device 108 sends the number to the multi-mode wireless terminal device 106 using a SIP Invite message. In turn, the multi-mode wireless terminal device 106 initiates the call to the called party over the WWAN 102. The multi-mode wireless terminal device 106 informs the WLAN terminal device 108 of the state of the WWAN call (e.g., ringing, busy, etc.) and the WLAN terminal user takes appropriate action (e.g., continue call, hang-up, etc.) If the called party accepts the call, the multi-mode wireless terminal device 106 informs the WLAN terminal device 108.

In step 414, for voice service, a VoIP (RTP) session is then setup between the multi-mode wireless terminal device 106 and WLAN terminal device 108. The multi-mode wireless terminal device 106 routes voice packets between the called party on the WWAN 102 and the WLAN terminal device 108 on the WLAN 104.

The voice session is terminated when any of the called party, multi-mode wireless terminal device 106 or WLAN terminal device 108 ends the call (step 416). When the called party or multi-mode wireless terminal device 106 ends the call, the multi-mode wireless terminal device 106 so informs the WLAN terminal device 108. Likewise, when the WLAN terminal user ends the call, the WLAN terminal device 108 so informs the multi-mode terminal device 106. The VoIP and SIP sessions are then torn down.

To establish a data service session (e.g. web browsing), a connection is established between the WLAN terminal device 108 and the multi-mode wireless terminal device 106 using a peer-to-peer protocol (step 412). The WLAN terminal device 108 then makes one or more data calls to the multi-mode wireless terminal device 106. In turn, the multi-mode wireless terminal device 106 connects to the requested data service (e.g., Internet) on the WWAN 102 and begins routing data traffic between the WWAN data service and the WLAN terminal 108 (step 414).

The data session is terminated when any of the service provider, multi-mode wireless terminal device 106 or WLAN terminal device 108 ends one of the connections (step 416). When the service provider or multi-mode wireless terminal device 106 ends a connection, the multi-mode wireless terminal device 106 so informs the WLAN terminal device 108. Likewise, when the WLAN terminal user ends the peer-to-peer connection, the WLAN terminal device 108 so informs the multi-mode wireless terminal device 106. The data sessions are then torn down.

The requests and responses of steps 408-412 can be performed using Session Initiation Protocol (SIP) messages.

The functions of the multi-mode wireless terminal device 106 described above in connection with the method of FIG. 4 can be implemented by the gateway software application 210 and OS 208 executing on the multi-mode wireless terminal device 106.

Figure 5:
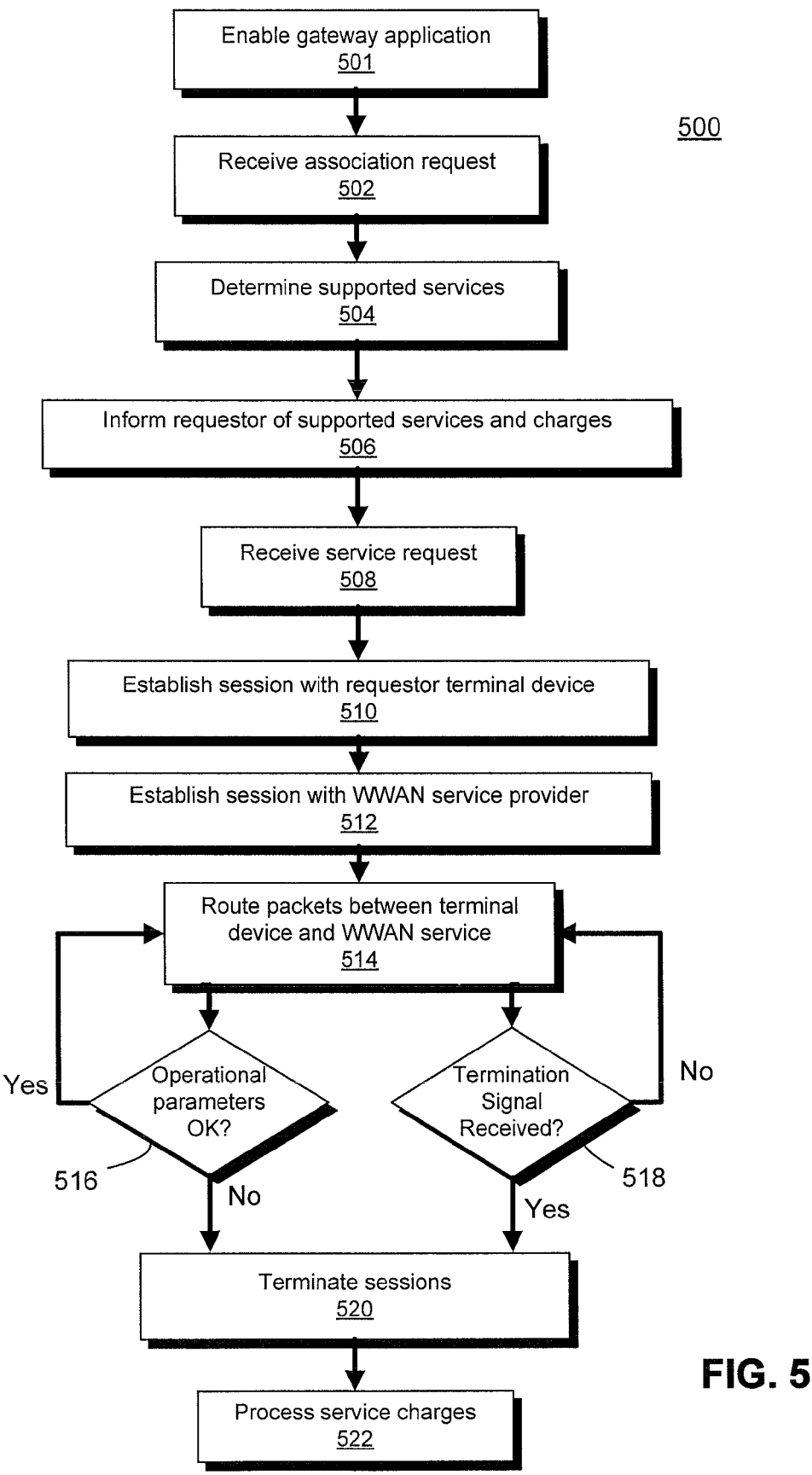
FIG. 5 is a flowchart of a method of operating a multi-mode terminal device shown in FIG. 1 in accordance with the exemplary embodiment of the invention.

FIG. 5 is a flowchart 500 of a method of operating one of the multi-mode wireless terminal devices 106 shown in FIG. 1 in accordance with the exemplary embodiment of the invention. Although the method may be performed by any combination of hardware, software and/or firmware in the multi-mode wireless terminal device 106, the method is preferably performed by hardware controlled by software 208, 210 running on the processor 204 of the multi-mode wireless terminal device 106

In step 501, a multi-mode terminal user enables the multi-mode wireless terminal device 106 to support the gateway functionality. The user interface of the multi-mode wireless terminal device 106 permits the user to selectively activate the gateway software application 210. Through the user interface, the multi-mode terminal user can also preset specific time periods during which the multi-mode wireless terminal device 106 can act as a gateway and provide WWAN services to WLAN terminal devices 108. When such periods are selected, the multi-mode wireless terminal device 106 supports WWAN services only during those times.

When the gateway software application 210 is enabled, the multi-mode wireless terminal device 106 awaits an 802.11x ad hoc association request from one of the WLAN terminal devices 108 over the WLAN 104 (step 502).

Upon receiving an association request, the multi-mode wireless terminal device 106 determines which, if any, WWAN services it currently supports (step 504). Multi-mode terminal operational parameters, such a battery power level, WLAN channel signal strength, WWAN channel signal strength, and current processing load can be monitored by the gateway software application 210 in determining whether to support WWAN services. If any of these parameters do not meet certain pre-selected thresholds, the multi-mode wireless terminal device 106 can deny the availability of WWAN services to the requesting WLAN terminal device 108. Also, the multi-mode wireless terminal device 106 can check WWAN service providers to determine current service availability from the WWAN service sources themselves to determine whether or not to offer WWAN service access to the requesting WLAN terminal device 108.

In response to a request for service availability from the WLAN terminal 108, the multi-mode wireless terminal device 106 informs the requesting WLAN terminal device 108 of the supported WWAN services and the usage charges applicable to such services on a per minute usage basis, as well as any limitations on usage time.

In step 508, the multi-mode wireless terminal device 106 receives a request from the WLAN terminal device 108 to initiate a service selected by the WLAN terminal user.

In step 510, the multi-mode wireless terminal device 106 establishes a service session with the requesting WLAN terminal device 108; and in step 512 the multi-mode wireless terminal device 106 establishes a session with the WWAN service. Details on how these sessions are established for voice and data services are discussed above in connection with steps 412-414 of FIG. 4.

The requests and responses of steps 506-512 can be performed using Session Initiation Protocol (SIP) messages.

After the WWAN and WLAN sessions are established, the multi-mode wireless terminal device 106 begins to route voice and/or data traffic between the WWAN service device and the WLAN terminal device 108 (step 514). The multi-mode wireless terminal device 106 performs all necessary functions, such as buffering, packetizing and the like, for successfully routing the voice and/or data traffic between the WLAN terminal 108 and WWAN service.

While the service is active, the multi-mode wireless terminal device 106 monitors its operational parameters, including WWAN and WLAN channel parameters (step 516), and also checks for incoming termination signals from either the WWAN service or WLAN terminal device 108 (step 518). If one or more of the operational parameters are out of range or a termination signal is received, the multi-mode wireless terminal device 106 tears down the sessions (step 520), as described above in connection with step 416 of FIG. 4.

With respect to operational parameters, multi-mode wireless terminal device 106 at least periodically monitors its own health, as well as the channel parameters of the communication links established through the WWAN 102 and WLAN 104. When channel and/or operational conditions are detected that are less than preferred thresholds, the multi-mode wireless terminal device 106 sends a warning message to the WLAN terminal device 108. If the channel conditions remain unsatisfactory for a predetermined period of time, the multi-mode wireless terminal device 106 terminates the sessions with the WWAN service and WLAN terminal device 108.

The operational triggering event that causes a session termination may be single parameter value exceeding a threshold or may be combination of conditions meeting criteria that is defined as the triggering event. The triggering event may be based on any number and combination of parameters, measurements, or conditions ascertainable by the multi-mode wireless terminal device 106. Examples of suitable triggering parameters include battery power level, processor load, memory usage, time limit constraints, received signal strength indicator (RSSI), bit error rate (BER), frame error rate (FER), jitter, and latency.

After terminating the session, the multi-mode wireless terminal device 106 calculates and processes fees for using the WWAN service (step 522). The charge account information provided by the WLAN terminal device 108 is used to charge the WLAN terminal user's online account on server 110 for the amount of services accessed through the multi-mode wireless terminal device 106. The charge account information received from the WLAN terminal device 108 can be stored persistently in the multi-mode terminal memory 206 so that the multi-mode wireless terminal device 106 can complete the charging transaction at a later time using Internet connectivity with the online account server 110.

The preceding detailed description has illustrated the principles of the invention using a specific embodiment of a communication system. However, the invention is not limited to this particular implementation. For example, the inventive principles disclosed herein can be implemented in many other types of wireless networks and with other types of terminal devices.

Therefore, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

What is claimed is:

1. A method for providing one or more services of a first wireless network to a wireless terminal device communicating with a second wireless network, comprising:
  establishing a session between the wireless terminal device and a multi-mode wireless terminal device capable of communicating with the first and second wireless networks;
  determining one or more operational parameters of the multi-mode wireless terminal device;
  selectively providing the services to the wireless terminal device through the multi-mode wireless terminal device based on the operational parameters of the multi-mode wireless terminal device;
  monitoring the wireless signal strength between the wireless terminal device and multi-mode wireless terminal device;
  transmitting a warning message to the wireless terminal device when the wireless signal strength drops below a predetermined threshold; and
  terminating the session between the wireless terminal device and the multi-mode wireless terminal device after the wireless signal strength has remained below the predetermined threshold for a predetermined time.

2. The method of claim 1, further comprising:
  scanning the second wireless network for a multi-mode wireless terminal device offering the services to devices located on the second wireless network.

3. The method of claim 1, further comprising:
  selecting the multi-mode wireless terminal device from a plurality of multi-mode wireless terminal devices offering the services to devices located on the second wireless network.

4. The method of claim 1, further comprising:
  notifying the wireless terminal device of a charge for accessing the services through the multi-mode wireless terminal device.

5. The method of claim 4, further comprising:
  receiving charge account information from the wireless terminal device; and
  charging the charge account for the amount of services accessed by the wireless terminal device through the multi-mode wireless terminal.

6. The method of claim 1, further comprising:
  determining a battery power level of the multi-mode wireless terminal device; and
  selectively providing the services to the wireless terminal device based on the determined battery power level.

7. The method of claim 1, further comprising:
  selecting a predetermined time period during which the wireless terminal device may access the services through the multi-mode wireless terminal device; and
  providing the services to wireless terminal device only during the predetermined time period.

8. A multi-mode wireless terminal device, comprising:
  a first transceiver for communicating with a first wireless network;
  a second transceiver for communicating with a second wireless network; and
  access means for a wireless terminal device communicating with the second wireless network to access one or more services of the first wireless network by way of the first and second transceivers;
  a user interface that permits a user of the multi-mode wireless terminal device to selectively enable the access means;
  a battery; and
  a circuit configured to determine a charge level of the battery and to selectively provide the services to the wireless terminal device based on the battery charge level.

9. The multi-mode wireless terminal device of claim 8, wherein the second wireless network is a wireless local area network (WLAN).

10. The multi-mode wireless terminal device of claim 8, wherein the second transceiver supports a peer-to-peer protocol for communicating with the wireless terminal device.

11. The multi-mode wireless terminal device of claim 8, wherein the first wireless network is a wide-area cellular network.

12. The multi-mode wireless terminal device of claim 8, wherein the services include voice service, data service, E911 service or short messaging service (SMS).

13. A communication system, comprising:
  a multi-mode wireless terminal device including a wireless local area network (WLAN) transceiver configured to exchange wireless signals with a WLAN and a cellular transceiver configured to exchange wireless signals with a cellular wireless network providing one or more cellular services that are not offered by the WLAN;

a WLAN terminal device configured to connect to the multi-mode wireless terminal device over the WLAN in order to access the cellular services by way of the WLAN and cellular transceivers and including means for selecting the multi-mode wireless terminal device from a plurality of multi-mode wireless terminal devices offering the cellular services to devices communicating with the WLAN; and a server, in communication with the multi-mode wireless terminal device, for maintaining an online account on behalf of a user of the WLAN terminal device, wherein the multi-mode wireless terminal device charges the online account for the cellular services used by the WLAN terminal device.

14. The communication system of claim 13, wherein the WLAN terminal device includes a display for displaying to a user fees associated with accessing the cellular services by way of the multi-mode wireless terminal device.

15. The communication system of claim 13, wherein the WLAN terminal device includes means for scanning the WLAN for a multi-mode wireless terminal device offering the services to devices communicating with the WLAN.

* * * * *